J. T. Case,
Water Wheel.
No. 112,545.   Patented Mar. 14, 1871.

Inventor,
Joel T. Case

Witnesses,
James Shepard

UNITED STATES PATENT OFFICE.

JOEL T. CASE, OF BRISTOL, CONNECTICUT, ASSIGNOR TO NATIONAL WATER-WHEEL COMPANY, OF SAME PLACE.

IMPROVEMENT IN WATER-WHEELS.

Specification forming part of Letters Patent No. 112,545, dated March 14, 1871.

I, JOEL T. CASE, of Bristol, in the county of Hartford and State of Connecticut, have invented certain new and useful Improvements in Water-Wheels, of which the following is a specification:

My invention may be described as an improvement on the patent granted to myself November 1, 1870; and consists in the peculiar construction of the chutes in the wheel-case and the gates, as hereinafter described.

Figure 1:
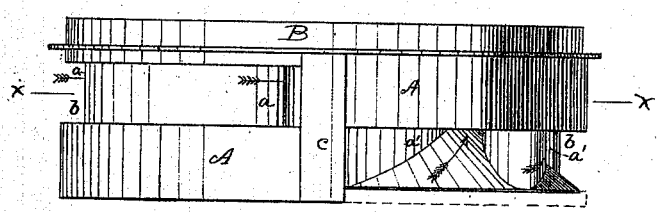
Figure 2:
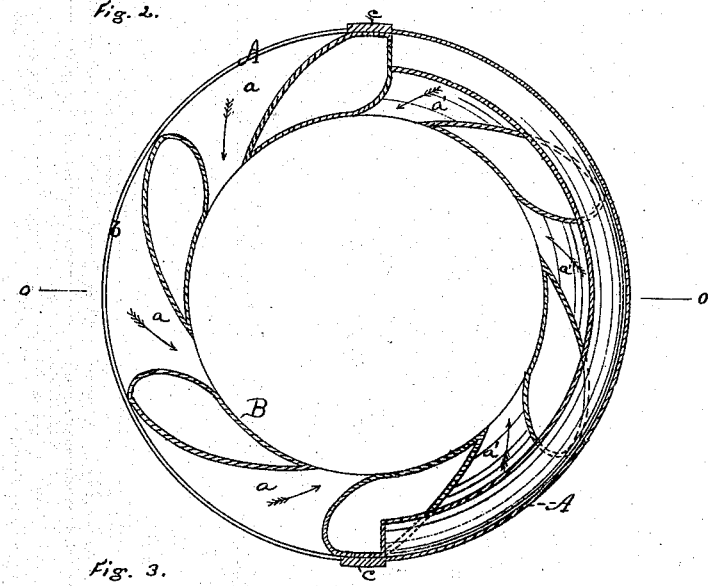
Figure 3:
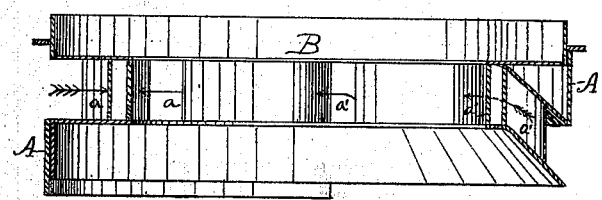
Figure 4:
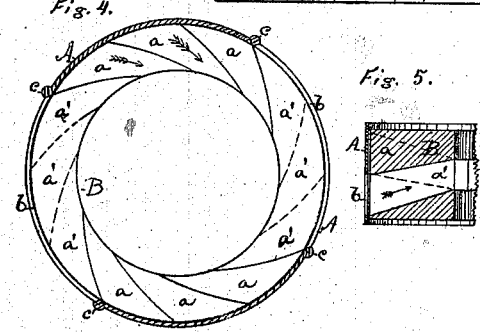

In the accompanying drawing, Figure 1 is a side elevation of the wheel-case and gate of my invention; Fig. 2, a horizontal section of the same on line $x\,x$; Fig. 3, a vertical section of the same on line $o\,o$; Fig. 4, a horizontal section of a modification of the same, and Fig. 5 a vertical section of a portion of Fig. 4.

A designates the gate, and B the wheel-case, provided with chutes $a\,a'$, either thickly set with simple guides between them, as shown in Fig. 4, or with a blank space between, as shown in Figs. 1, 2, and 3, as may be desired. The case is intended to be used with any of the ordinary turbine wheels which receive the water upon their edge.

One-half of the chutes $a$ are set so that their mouth or inlet is out of line with the mouth of the remaining chutes, $a'$, while the outlet of all the chutes $a\,a'$ is on the same line around the inner edge of the case B, as shown at Fig. 3.

Figure 5:
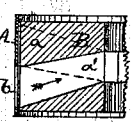

The chutes in the different lines or tiers may both of them extend obliquely toward the inner edge of the case B, as indicated at Fig. 5; or those on one line or tier may extend inward horizontally, and the others obliquely, as shown at Figs. 1, 2, and 3. It may be preferable to incline the upper line or tier of chutes downward toward the inner edge of the case, and to extend the lower line or tier of chutes horizontally inward. The outlet or inner end of all the chutes should be nearly horizontal for a short distance into the case, so as to eject the water horizontally upon the edge of the wheel.

Around the outer edge of the case B is the poop-gate A, of a width equal to the depth of the edge of said case, and provided with openings $b$, which are also out of line, so as to correspond with the mouth or inlet of the chutes $a\,a'$.

If desired, the gate A may be strengthened by a rim above and below the openings $b$, and also by the rib $c$ at the point near the ends of the upper and lower openings $b$. The gate A may have only two openings, each extending nearly one-half of its length, as shown in Figs. 1, 2, and 3, or four openings, the two lower ones of which are shown in Fig. 4.

By any proper mechanism the gate A is rotated until the openings are in front of the inlets to all the chutes $a\,a'$, when the gate is open. (See Fig. 1.) By turning the gate A so that all the openings $b$ are brought in front of the blank or solid portion of the edge of the case B, (which is immediately above and below the mouth or inlet of the chutes $a\,a'$,) the solid portion of gate A closes all of the chutes. It is often desirable to open less than the whole number of chutes and leave the remainder of them closed. By turning the gate A so as to leave a portion only of the openings $b$ in front of the chutes, either one or two pairs of chutes upon opposite sides of the case B may be opened, as may be desired.

The arrangement shown in Fig. 4 would in like manner open either two or four pairs of chutes; but if this case with twelve chutes was combined with a gate having only two openings, any number from one to five pairs of chutes might be opened upon two opposite sides of the case, and at the same time in each instance leave the remaining chutes closed.

The case B may be used with a solid poop-gate, made so as to rise and lower across the edge of the case, by simply placing the chutes with their inlets in separate lines, as before described, but with those in each line or tier equally divided upon opposite sides of the case.

By raising the gate sufficiently to uncover only the mouth of the chute $a'$ in the lower line or tier, one-half of the chutes would be fully open and the other half remain closed.

By placing the chutes with their inlets in three separate lines around the case, the rising of the poop would open one-third, two-thirds, or all of the chutes, as may be desired. Thus the case B may be modified in many respects. So long as it retains its generic feature of placing the chutes with their inlets on separate lines around the case it will produce substantially the same result.

The advantage derived from this invention is the same as that derived from the wheel-case described in my patent of November 1, 1870—viz., that at a "part gate" the open chutes are fully open, while the others remain closed—and also a further advantage, that the width of the chutes at their inlets and the necessary guides between them may occupy the whole circumference of the case.

I claim as my invention—

1. The case B, constructed with its chutes $a$ $a'$ having inlets upon separate lines around the said case, substantially as and for the purpose described.

2. In combination with the foregoing, the rotating gate A, provided with openings $b$, corresponding with the inlets of the chutes in separate lines around the gate, substantially as and for the purpose described.

JOEL T. CASE.

Witnesses:
JAMES SHEPARD,
T. T. WILSDON.